US012141919B2

(12) United States Patent
Cieplinski et al.

(10) Patent No.: US 12,141,919 B2
(45) Date of Patent: Nov. 12, 2024

(54) DYNAMIC BUILDING EXTRUSION IN ELECTRONIC MAPS

(71) Applicant: Mapbox, Inc., Washington, DC (US)

(72) Inventors: Avi Elias Cieplinski, San Francisco, CA (US); Brennan Boblett, Orinda, CA (US)

(73) Assignee: MAPBOX, INC., Washington, DC (US)

( * ) Notice: Subject to any disclaimer, the term of this patent is extended or adjusted under 35 U.S.C. 154(b) by 0 days.

(21) Appl. No.: 18/223,799

(22) Filed: Jul. 19, 2023

(65) Prior Publication Data
US 2023/0368466 A1 Nov. 16, 2023

Related U.S. Application Data

(63) Continuation of application No. 17/486,433, filed on Sep. 27, 2021, now Pat. No. 11,790,603, which is a (Continued)

(51) Int. Cl.
*G06T 17/05* (2011.01)
*G01C 21/36* (2006.01)
*G06F 16/29* (2019.01)
*G06F 16/9537* (2019.01)
*G06T 11/20* (2006.01)

(52) U.S. Cl.
CPC ............ *G06T 17/05* (2013.01); *G01C 21/367* (2013.01); *G06F 16/29* (2019.01); *G06F 16/9537* (2019.01); *G06T 11/203* (2013.01)

(58) Field of Classification Search
CPC ....... G06T 17/05; G06T 17/10; G06T 11/203; G06F 16/9537; G06F 16/29; G01C 21/367; G01C 21/3638
See application file for complete search history.

(56) References Cited

U.S. PATENT DOCUMENTS 5,999,879 A 12/1999 Yano
8,843,317 B1 * 9/2014 Ledet .................... H04W 12/06
340/905

(Continued)

OTHER PUBLICATIONS

Bellotti, F., et al. "An architectural approach to efficient 3D urban modeling," Journal of Computers and Graphics, vol. 35, Issue 5, Oct. 2011, pp. 1001-1012.

(Continued)

Primary Examiner — Daniel F Hajnik
(74) Attorney, Agent, or Firm — FENWICK & WEST LLP

(57) ABSTRACT

A system or a method for rendering building extrusion on an electronic map. The system receives geographic location information from a client device. Responsive to receiving the geographic location information, the system obtains a portion of two-dimensional electronic map data and a portion of three-dimensional electronic map data representing a building at a location indicated by the received geographic location information. The system also analyzes user data to obtain contextual information associated with the building, and renders the area of the electronic map with the contextual information associated with the building. The building on the electronic map is rendered in three dimensions as an extruded element, and rest of the area on the electronic map is rendered in two dimensions.

20 Claims, 7 Drawing Sheets

Related U.S. Application Data continuation of application No. 16/737,541, filed on Jan. 8, 2020, now Pat. No. 11,189,089.

(56) References Cited

U.S. PATENT DOCUMENTS

| | | | |
|---|---|---|---|
| 2003/0151592 A1 | 8/2003 | Ritter | |
| 2009/0046093 A1 | 2/2009 | Kikuchi et al. | |
| 2010/0161212 A1 | 6/2010 | Han | |
| 2012/0092326 A1* | 4/2012 | Borak | G09B 29/007 345/589 |
| 2013/0096813 A1* | 4/2013 | Geffner | H04W 4/21 455/457 |
| 2013/0322665 A1 | 12/2013 | Bennett et al. | |
| 2014/0278067 A1* | 9/2014 | Gordon | G09B 29/106 701/457 |
| 2018/0052596 A1 | 2/2018 | Bemel-Benrud et al. | |
| 2018/0349413 A1 | 12/2018 | Shelby et al. | |
| 2019/0108909 A1* | 4/2019 | Lee | G01C 21/3484 |

OTHER PUBLICATIONS

Digimap. "OS MasterMap and Building Heights—ArcGIS: Digimap webinar," Youtube, Jun. 10, 2015, one page, [Online] [Retrieved on Jan. 11, 2023], Retrieved from the Internet <URL: https://www.youtube.com/watch?v=1cju-i4XcEw>.

Grabler, F., et al. "Automatic generation of tourist maps." ACM Transactions on Graphics, vol. 27, Issue 3, Aug. 1, 2008, pp. 1-11.

United States Office Action, U.S. Appl. No. 16/737,541, filed Nov. 12, 2020, 23 pages.

United States Office Action, U.S. Appl. No. 16/737,541, filed Apr. 9, 2021, 20 pages.

United States Office Action, U.S. Appl. No. 17/486,433, filed Aug. 2, 2022, 22 pages.

United States Office Action, U.S. Appl. No. 17/486,433, filed Sep. 30, 2022, 23 pages.

United States Office Action, U.S. Appl. No. 17/486,433, filed Jan. 11, 2023, 21 pages.

* cited by examiner

DYNAMIC BUILDING EXTRUSION IN ELECTRONIC MAPS

CROSS-REFERENCE TO RELATED APPLICATION

This application is a continuation of U.S. application Ser. No. 17/486,433, filed Sep. 27, 2021, which is a continuation of U.S. application Ser. No. 16/737,541, filed Jan. 8, 2020, now U.S. Pat. No. 11,189,089. The subject matter of all of the foregoing is incorporated herein by references in their entirety.

TECHNICAL FIELD

The disclosure relates generally to the field of generating electronic maps and specifically to navigation applications involving electronic maps.

BACKGROUND

Digitally stored electronic maps are used to provide directions to users of mobile and other computing devices, for example, using any of a wide array of standalone map or direction application programs or applications. Current electronic map systems correctly determine where a mobile device is within a few feet or meters and can show where the user of that mobile device is on an electronic map in real time. Additional elements may also be shown to better orient the user.

Electronic maps also appear in other applications aside from standalone mapping applications. For example, ride sharing applications, taxi applications, video games, and other applications may use electronic maps. These or other applications can obtain electronic maps by calling a map server computer through an Application Programming Interface (API). Thus, a single electronic map provider that owns or operates the server computer may supply the electronic maps for many different applications.

Oftentimes electronic maps include great quantities of visual information, so much so that particular map features can become difficult to distinguish. This problem may be exacerbated in navigation contexts, where an electronic map provides navigation guidance, yet map features related to navigation remain difficult to distinguish from neighboring map features.

SUMMARY

Geographical maps are increasingly created and stored in an electronic format, and represent spatial aspects of a given area. In many use cases of electronic maps, it is desirable to represent geographic information in a visually pleasing and comprehensible manner. For example, in many cases, such as in real-time navigation systems, it is desirable that a destination location on a route be easily distinguishable from nearby locations.

In one embodiment, a client map application receives geographic location information, such as from a user input. The client map application retrieves electronic map data representing a specific building at a location indicated by the received geographic location information. The client map application generates an extruded building graphical element illustrating the specific building in three dimensions based on the retrieved electronic map data representing the specific building. The client map application renders an electronic map representing two-dimensional electronic map data. The electronic map also includes the extruded building graphical element such that buildings other than the specific building are rendered distinctly from the extruded building graphical element, such as in two dimensions or in an alternative color, and the specific building is rendered in three dimensions.

In an embodiment, the client map application receives user input, such as a query, specifying a type of building. The client map application retrieves electronic map data representing a set of buildings corresponding to the building type indicated by the received user input. Based on the retrieved electronic map data representing the specific building, the client map application generates, for each building in the set of buildings, an extruded building graphical element illustrating the building in three dimensions. The client map application renders an electronic map representing two-dimensional electronic map data, wherein the electronic map further comprises the extruded building graphical elements, such that buildings other than the buildings in the set of buildings are rendered distinctly from the extruded building graphical element, such as in two dimensions or an alternative color, and the buildings in the set of buildings are rendered in three dimensions.

In an embodiment, extruded building graphical elements additionally include contextual information, such as a label, a color, or a partial highlighting specifying a portion of the extruded building graphical element. The client map application may retrieve the contextual information from map data and/or interconnected software of the mobile computing device. The contextual information may additionally be used to customize the extruded building graphical element, such as using a particular color to color an extruded building graphical element representing a building that corresponds to a particular business.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

I. General Overview

How to best distinguish a destination location within an electronic map is an ongoing problem. The problem is further complicated when electronic maps include a great quantity of visual information, which can distract from the destination location. The problem is exacerbated in building-dense locations, such as cities, with multiple possible destinations within a short distance of each other. As detailed below, a novel approach to destination location indication better distinguishes the destination location from nearby geographic features, easing user recognition of the destination location.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

II. System Overview

Figure 1:
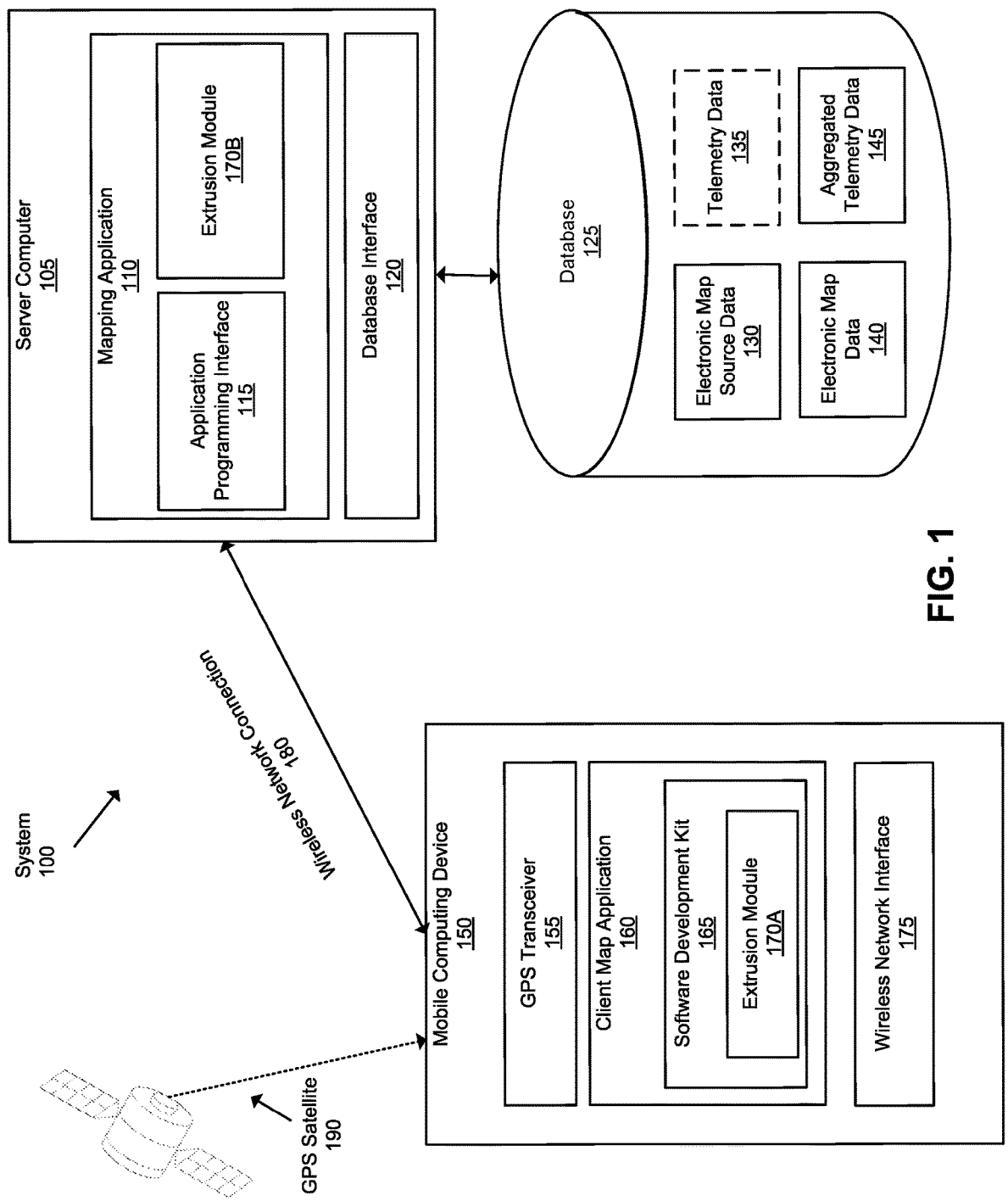
FIG. 1 illustrates an example computer system in which the techniques described may be practiced, according to one embodiment.

Computer-implemented techniques are provided for rendering electronic maps with extruded building graphical elements. FIG. 1 illustrates an example computer system in which the techniques provided may be practiced, according to one embodiment.

FIG. 1 uses like reference numerals to identify like elements. A letter after a reference numeral, such as "115A," indicates that the text refers specifically to the element having that particular reference numeral. A reference numeral in the text without a following letter, such as "115," refers to any or all of the elements in the figures bearing that reference numeral. For example, "115" in the text refers to reference numerals "115A," and/or "115B" in the figures.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 150 that is coupled via a wireless network connection 180 to a server computer 105, which is coupled to a database 125. A GPS satellite 190 is coupled via a wireless connection to the mobile computing device 150. The server computer 105 comprises a mapping application 110, an application programming interface (API) 115, an extrusion module 170B and a database interface 120. The database 125 comprises electronic map source data 130, electronic map data 140, telemetry data 135, and aggregated telemetry data 145. The mobile computing device 150 comprises a GPS transceiver 155, client map application 160, software development kit (SDK) 165, extrusion module 170A, and wireless network interface 175.

II.A. Server and Database

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 125 and mobile computing device 150 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 120, to facilitate various aspects of embodiments described herein.

In one embodiment, database interface 120 is a programmatic interface such as JDBC or ODBC for communicating with database 125. Database interface 120 may communicate with any number of databases and any type of database, in any format. Database interface 120 may be a piece of custom software created by an entity associated with mapping application 110, or may be created by a third-party entity in part or in whole.

In one embodiment, database 125 is a data storage subsystem consisting of programs and data that is stored on any suitable storage device such as one or more hard disk drives, memories, or any other electronic digital data recording device configured to store data. Although database 125 is depicted as a single device in FIG. 1, database 125 may span multiple devices located in one or more physical locations. For example, database 125 may include one or more nodes located at one or more data warehouses. Additionally, in one embodiment, database 125 may be located on the same device or devices as server computer 105. Alternatively, database 125 may be located on a separate device or devices from server computer 105.

Database 125 may be in any format, such as a relational database, a noSQL database, or any other format. Database 125 is communicatively connected with server computer 105 through any kind of computer network using any combination of wired and wireless communication of the type previously described. Optionally, database 125 may be communicatively connected with other components, either directly or indirectly, such as one or more third party data suppliers. Generally, database 125 stores data related to electronic maps including, but not limited to: electronic map source data 130, electronic map data 140, telemetry data 135, and aggregated telemetry data 145. These datasets may be stored as columnar data in a relational database or as flat files.

In one embodiment, electronic map source data 130 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 130 may be updated at any suitable interval, and may be stored for any amount of time. Once obtained or received, electronic map source data 130 is used to generate electronic map data 140.

In one embodiment, electronic map data 140 is digital map data that is provided, either directly or indirectly, to client map applications, such as client map application 160, using an API. Electronic map data 140 is based on electronic map source data 130. Specifically, electronic map source data 130 is processed and organized as a plurality of vector tiles which may be subject to style data to impose different display styles, and which may be organized in a tile pyramid. Electronic map data 140 may be updated at any suitable interval, and may include additional information beyond that derived from electronic map source data 130. For example, using aggregated telemetry data 145, discussed below, various additional information may be stored in the vector tiles, such as traffic patterns, turn restrictions, detours, common or popular routes, speed limits, new streets, and any other information related to electronic maps or the use of electronic maps.

Vector tiles are vector data similar to image tiles for web mapping. Vector tiles define geometries and properties of an electronic map, but not full visual style. The same vector tiles can be used to generate maps of varying visual styles—a dark, nighttime style can use the same vector tiles as a light, daytime style for visualization, for example. Styles are sets of rules, created independently of vector tiles, which define the visual appearance of an electronic map when it is rendered. A style can include information about data sources, style layers, sprites, glyphs, and metadata, for example.

Vector data can include geometry data representing map features such as roads, bodies of water, public parks, buildings, and so on, as well as metadata corresponding to map features, such as textual labels. An electronic map is rendered from one or more vector tiles when requested by a client, such as a web browser or a mobile application, by applying a styling to the vector data of the vector tiles to create one or more layers used to visualize map features. Map features can be represented in a rendered electronic map by graphical elements, which are used to convey map information to a user of the electronic map. Graphical elements may include, for example, lines, textures, and colors. Each layer is a stylized representation of a portion of an electronic map based on both vector data and styling rules. For example, one layer may represent all highways within the geographic area represented by an electronic map. A second layer may include label graphical elements that label other graphical elements within the electronic map.

A style can affect the size, font, color, highlighting, kerning, displayed text, or so on, of a graphical element. For example, for a label graphical element with text string "University Avenue," one style may cause a Times New Roman size 12 rendering of "University Avenue" in black, while a second style may cause a Calibri size 10 rendering of "University Ave" in red.

The electronic map may be displayed at any of a plurality of zoom levels. For example, electronic maps may be displayed at zoom levels from 0 to 22; in some embodiments, incremental zoom levels may be selected, such as 2.01, 2.02, or other fractional zooms. In an embodiment, zooming is continuous from a maximum level to a minimum level and vice versa. Each zoom level corresponds to one or more vector tiles for that level, as well as with one or more styles, which can change as the electronic map is zoomed in or out. For example, the opacity of a line may change as a function of zoom level. Similarly, different layers may be displayed at different zoom levels, and those different layers may use different geometry data and metadata depending upon their specific associated vector tiles.

The electronic map can be displayed at a number of combinations of zoom, bearing, and pitch, and may be panned to display different sections of the electronic map. Adjusting the zoom, bearing, or pitch may change which graphical elements are rendered, including building graphical elements, and/or how they are rendered. For example, when zoom level changes from level 2 (z2) to level 3 (z3) and z3 vector tiles (with data other than or additional to that of the z2 vector tiles) are loaded and used for rendering, additional graphical elements not included in the z2 vector tiles (but included in the z3 vector tiles) are rendered. Henceforth in this specification a zoom level may be referred to by "z" followed by its numerical value, such as z3. Vector tiles may likewise be referred to by a specific associated zoom level, such as z3 vector tiles. Similarly, a building graphical element may be referred to as a "building" and a graphical element in general may be referred to as a "symbol."

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 145.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 145 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 145 is stored in association with one or more tiles related to electronic map data 140. Aggregated telemetry data 145 may be stored for any amount of time, such as a day, a week, or more. Aggregated telemetry data 145 may be further processed or used by various applications or functions as needed.

II.B. Mobile Computing Device

In one embodiment, mobile computing device 150 is any mobile computing device, such as a laptop computer, handheld computer, wearable computer, cellular or mobile phone, portable digital assistant (PDA), or tablet computer. Alternatively, mobile computing device 150 could be a desktop computer or an interactive kiosk. Although a single mobile computing device is depicted in FIG. 1, any number of mobile computing devices may be present. Each mobile computing device 150 is communicatively connected to server computer 105 through wireless network connection 180 which comprises any combination of a LAN, a WAN, one or more internetworks such as the public Internet, a cellular network, or a company network.

Mobile computing device 150 is communicatively coupled to GPS satellite 190 using GPS transceiver 155. GPS transceiver 155 is a transceiver used by mobile computing device 150 to receive signals from GPS satellite 190, which broadly represents three or more satellites from which the mobile computing device may receive signals for resolution into a latitude-longitude position via triangulation calculations.

Mobile computing device 150 also includes wireless network interface 175 which is used by the mobile computing device to communicate wirelessly with other devices. In particular, wireless network interface 175 is used to establish wireless network connection 180 to server computer 105. Wireless network interface 175 may use WiFi, WiMAX, Bluetooth, ZigBee, cellular standards or others.

Mobile computing device 150 also includes extrusion module 170A which is used by the mobile computing device as part of the client map application 160 to provide building extrusion functionality. In some embodiments extrusion module 170A collaborates with extrusion module 170B of the server computer 105 to provide building extrusion functionality. Alternatively, in some embodiments either extrusion module 170A or extrusion module 170B solely provides building extrusion functionality, in which case the other module may not be present in the system 100.

Mobile computing device 150 also includes other hardware elements, such as one or more input devices, memory, processors, and the like, which are not depicted in FIG. 1. Mobile computing device 150 also includes applications, software, and other executable instructions to facilitate various aspects of embodiments described herein. These applications, software, and other executable instructions may be installed by a user, owner, manufacturer, or other entity related to mobile computing device 150. In one embodiment, mobile computing device 150 includes client map application 160 which is software that displays, uses, supports, or otherwise provides electronic mapping functionality as part of the application or software. Client map application 160 may be any type of application, such as a taxi service, a video game, a chat client, a food delivery application, etc. In an embodiment, client map application 160 obtains electronic mapping functions through SDK 165, which may implement functional calls, callbacks, methods or other programmatic means for contacting the server computer to obtain digital map tiles, layer data, or other data that can form the basis of visually rendering a map as part of the application. In general, SDK 165 is a software development kit that allows developers to implement electronic mapping without having to design all of the components from scratch. For example, SDK 165 may be downloaded from the Internet by developers, and subsequently incorporated into an application which is later used by individual users.

In server computer 105, the mapping application 110 provides the API 115 that may be accessed, for example, by client map application 160 using SDK 165 to provide electronic mapping to client map application 160. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 145, receiving electronic map source data 130 from data providers, processing electronic map source data 130 to generate electronic map data 140, and any other aspects of embodiments described herein. Mapping application 110 includes extrusion module 170B which may be used to enable building extrusion functionality on client map application 160. Depending upon embodiment, building extrusion functionality may be provided wholly on the mobile computing device 150 via extrusion module 170A, wholly on the server computer 105 via extrusion module 170B, or in part by each extrusion module 170 working in conjunction. The sub-components of the extrusion module 170, described below, may be divided among the extrusion module 170A and 170B, or may be wholly one, to the exclusion or redundancy of the other.

II. C. Hardware Environment

According to one embodiment, the techniques described herein are implemented by one or more special-purpose computing devices. For example, the server computer 105 and mobile computing device 150 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
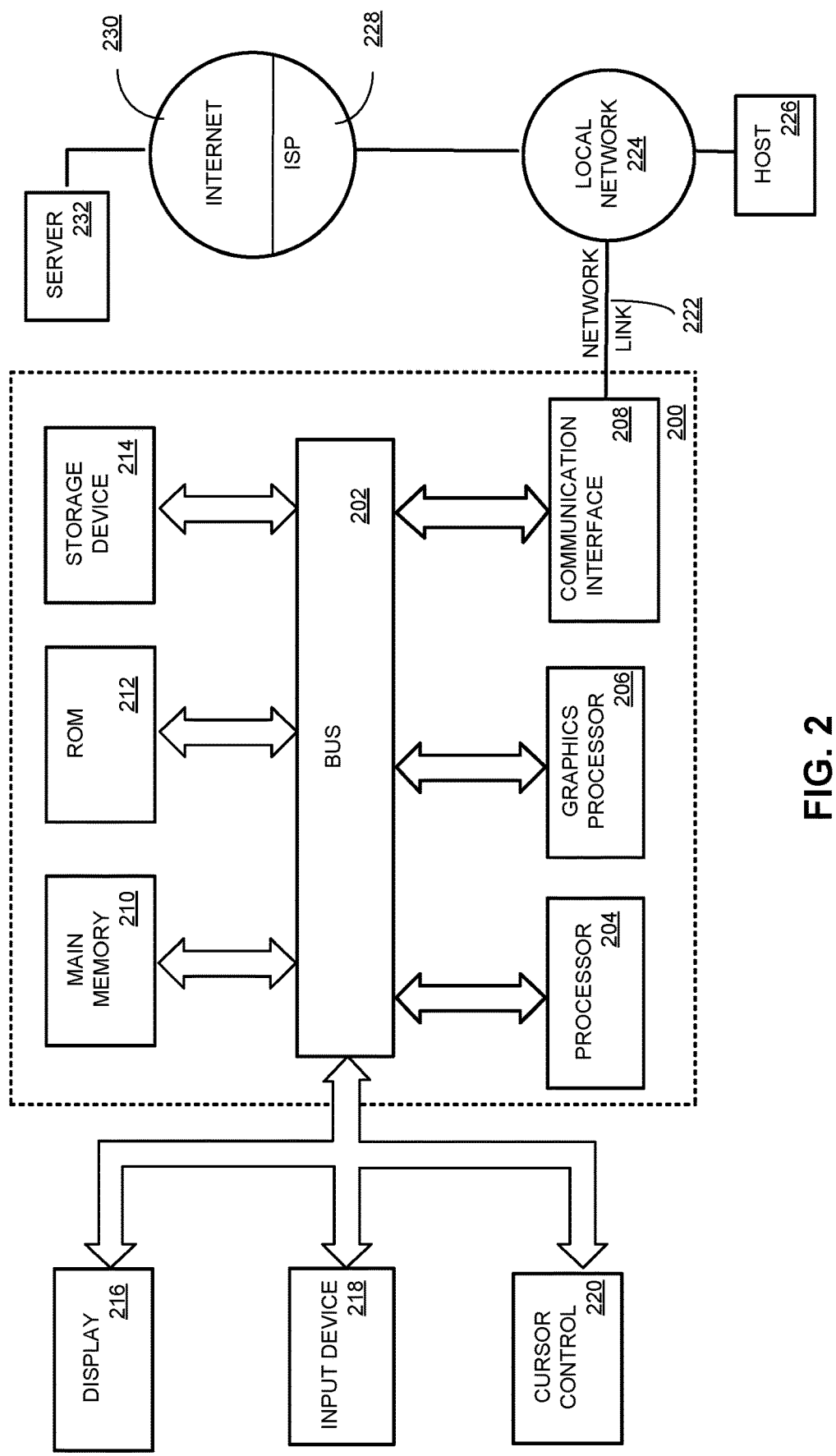
FIG. 2 is a block diagram that illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor (CPU) 204 and graphics processor (GPU) 206 coupled with bus 202 for processing information. CPU 204 may be, for example, a general purpose microprocessor. GPU 206 may be, for example, a graphics processing unit with a high core count which is optimized for parallel processing and graphics rendering.

Computer system 200 also includes a main memory 210, such as a random access memory (RAM) or other dynamic storage device, coupled to bus 202 for storing information and instructions to be executed by CPU 204. Main memory 210 also may be used for storing temporary variables or other intermediate information during execution of instructions to be executed by CPU 204 and/or GPU 206. Such instructions, when stored in non-transitory storage media accessible to CPU 204 and/or GPU 206, render computer system 200 into a special-purpose machine that is customized to perform the operations specified in the instructions.

Computer system 200 further includes a read only memory (ROM) 212 or other static storage device coupled to bus 202 for storing static information and instructions for CPU 204 and/or GPU 204. A storage device 214, such as a magnetic disk or optical disk, is provided and coupled to bus 202 for storing information and instructions.

Computer system 200 may be coupled via bus 202 to a display 216, such as an LCD screen, LED screen, or touch screen, for displaying information to a computer user. An input device 218, which may include alphanumeric and other keys, buttons, a mouse, a touchscreen, and/or other input elements is coupled to bus 202 for communicating information and command selections to CPU 204 and/or GPU 206. In some embodiments, the computer system 200 may also include a cursor control 220, such as a mouse, a trackball, or cursor direction keys for communicating direction information and command selections to CPU 204 and/or GPU 206 and for controlling cursor movement on display 216. The cursor control 220 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to CPU 204 and/or GPU 206 executing one or more sequences of one or more instructions contained in main memory 210. Such instructions may be read into main memory 210 from another storage medium, such as storage device 214. Execution of the sequences of instructions contained in main memory 210 causes CPU 204 and/or GPU 206 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 214. Volatile media includes dynamic memory, such as main memory 210. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to CPU 204 and/or GPU 206 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 210, from which CPU 204 and/or GPU 206 retrieves and executes the instructions. The instructions received by main memory 210 may optionally be stored on storage device 214 either before or after execution by CPU 204 and/or GPU 206.

Computer system 200 also includes a communication interface 208 coupled to bus 202. Communication interface 208 provides a two-way data communication coupling to a network link 222 that is connected to a local network 224. For example, communication interface 208 may be an integrated services digital network (ISDN) card, cable modem, satellite modem, or a modem to provide a data communication connection to a corresponding type of telephone line. As another example, communication interface 208 may be a local area network (LAN) card to provide a data communication connection to a compatible LAN. Wireless links may also be implemented. In any such implementation, communication interface 208 sends and receives electrical, electromagnetic or optical signals that carry digital data streams representing various types of information.

Network link 222 typically provides data communication through one or more networks to other data devices. For example, network link 222 may provide a connection through local network 224 to a host computer 226 or to data equipment operated by an Internet Service Provider (ISP) 228. ISP 228 in turn provides data communication services through the world wide packet data communication network now commonly referred to as the "Internet" 230. Local network 224 and Internet 230 both use electrical, electromagnetic or optical signals that carry digital data streams. The signals through the various networks and the signals on network link 222 and through communication interface 208, which carry the digital data to and from computer system 200, are example forms of transmission media.

Computer system 200 can send messages and receive data, including program code, through the network(s), network link 222 and communication interface 208. In the Internet example, a server 232 might transmit a requested code for an application program through Internet 230, ISP 228, local network 224 and communication interface 208. The received code may be executed by CPU 204 and/or GPU 206 as it is received, and stored in storage device 214, or other non-volatile storage for later execution.

III. Tile Pyramid

A tile pyramid is a tree of vector tiles. The root of the tree is a singular z0 vector tile with high level vector data for the entire geographic area captured by the electronic map. For example, the z0 vector tile of a world map would define high level geometries and properties for the entire world, such as continents, oceans, and national borders.

In an embodiment, the z0 vector tile has four children, each being a z1 vector tile that has more detailed vector data for a quarter of the z0 vector tile. The quarter of the z0 vector tile represented by each z1 vector child is, for example, a Cartesian quadrant of the parent z0 vector tile. The more specific vector data each z1 vector tile includes may be, for example, state borders, major rivers and lakes, and mountain ranges. Each z1 vector tile can include vector data similar to that of the z0 vector tile. For example, if a z1 vector tile includes vector data for both Europe and Asia, a continental border may be included in the vector data.

Similarly, in this example each z1 vector tile has four z2 children in the tree, which each represent a quarter of their respective parent. Each z2 vector tile has more detailed vector data than that of its parent z1 vector tile, similar to how each z1 vector tile included more detailed vector data than their parent, the z0 vector tile. For example, each z2 vector tile's vector data may include data for major cities, major highways, and forests, plains, deserts and other large geographic features.

In a similar manner, this example tree grows with each zoom level, with each child vector tile having its own four children until a maximum zoom level is reached. z2 vector tile has children z3 vector tiles, z3 vector tiles have children z4 vector tiles, and so on, up to a maximum zoom level. For example, if zoom levels range from 0 to 22, the highest, most zoomed out level, z0, has 1 z0 vector tile, the next level, z1, has 4 vector tiles, z2 has 16 vector tiles, z3 has 64 vector tiles, and so on. As zoom level increases, vector tiles show a more geographically-granular level of detail while representing a smaller overall geographic area. While the z0 vector tile may represent the entire world, a z22 vector tile may represent a cul-de-sac or a similarly small geographic area and the features therein.

Each vector tile in the tile pyramid may have its own coordinate system. In this case, the z0 vector tile coordinate system is a "global coordinate system" to which all other vector tiles can be mapped. For example, each z1 vector tile coordinate system covers one fourth the area of the z0 vector tile global coordinate system. As such, in this example there is a power of 2 relationship among coordinates of zoom levels one level of the tree apart from each other; however, this relation may vary depending on tree structure and/or the relative geographic area represented by vector tiles of successive zoom levels. In an embodiment, vector tile coordinates converted to global coordinates are rounded down. The extrusion module 170 can convert vector tile coordinates to latitudes and longitudes for use in building extrusion functionality, as described below.

IV. Extrusion Module

Figure 3:
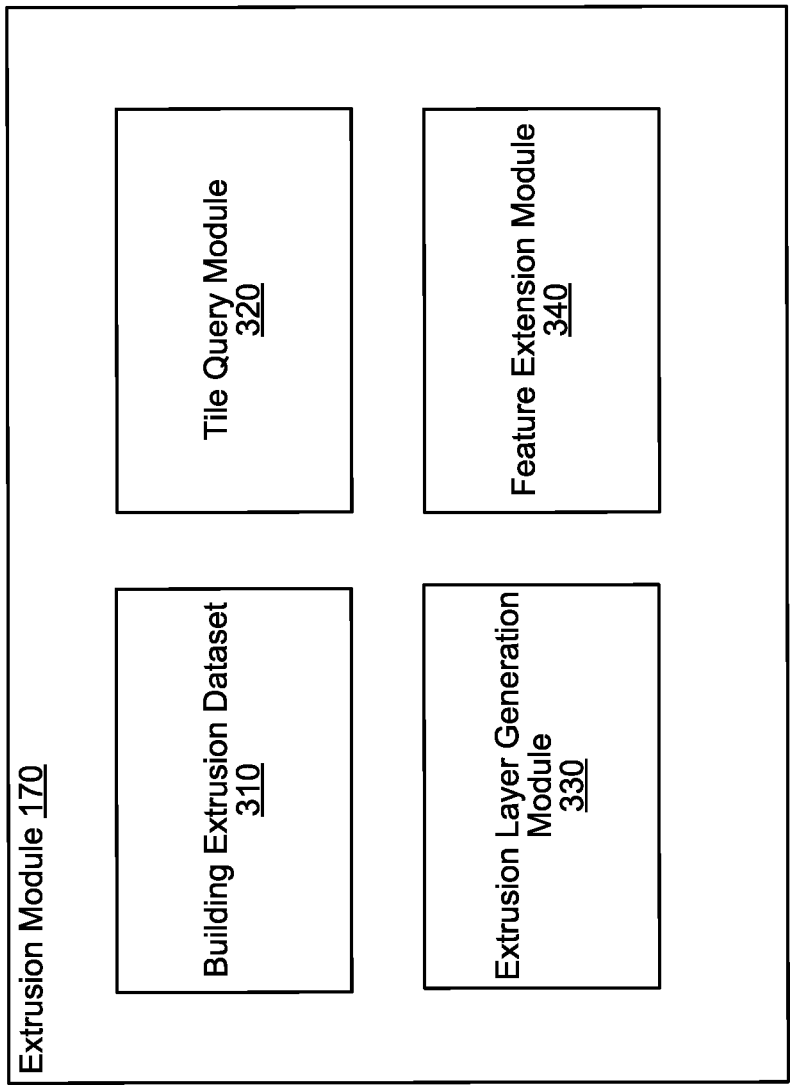
FIG. 3 illustrates an extrusion module, according to one embodiment.

FIG. 3 illustrates an extrusion module 170, according to one embodiment. The extrusion module 170 provides building extrusion functionality to the client map application 160. The extrusion module 170 includes a building extrusion dataset 310, a tile query module 320, an extrusion layer generation module 330, and a feature extension module 340.

Depending upon the embodiment, the extrusion module 170 exists partially on the mobile computing device as extrusion module 170A and partially on the mapping application 110 as extrusion module 170B, where each performs part of the functionality described herein. For example, in one embodiment, the building extrusion dataset 310 resides at extrusion module 170B upon the server computer 105, whereas the remaining modules reside at extrusion module 170A upon the mobile computing device 150. Alternatively, the entirety of the extrusion module 170 may be present at either the mobile computing device 150 or the server computer 105, in which case the extrusion module 170 may not be present upon the other device. In some embodiments, the building extrusion dataset 310 resides at the database 125 and is accessed either directly by the mobile computing device 150 or via the server computer 105, e.g., via an application programming interface (API) for querying the building extrusion dataset 310 which is exposed to and used by the extrusion module 170.

The building extrusion dataset 310 comprises building data organized in a vector tile set. Each building in the building extrusion dataset 310 includes three-dimensional vector data representing an approximate shape of the building in terms of points, lines, and/or polygons. In some embodiments, the three-dimensional vector data approximation of a building, a "building model," is proportional to other building models in the building extrusion dataset 310. For example, a building model of a ten-story building is represented as approximately twice as tall as the building model of a five-story building. Alternatively, in other embodiments the rendered height of building models may scale logarithmically with true height. Each building in the building extrusion dataset 310 also includes a feature identifier, a "feature ID," that distinguishes the building from the other buildings in the building extrusion dataset 310. Each building in the building extrusion dataset 310 also includes coordinates, e.g., locations in terms of latitude and longitude. The building's footprint may be recorded in terms of a geographic area occupied by the building, where any point within the occupied geographic area corresponds to the building. Depending upon the embodiment, additional data may be included in the building extrusion dataset 310 for some or all buildings, such as a street address, a name of one or more businesses occupying the building, a building color, a building type (e.g., a gas station, a post office, a restaurant), and so on.

As described above, the client map application 160 provides electronic mapping functionality. The client map application 160 enables selection of a particular location or map feature, such as a building, within the electronic map. The client map application 160 may include a navigation component where the client map application 160 generates a set of navigation instructions from a current location of the mobile computing device 150 to a specified location, e.g., a location specified by user input to the client map application 160. The electronic map generated by the client map application 160 includes map data from one or more vector tiles at a particular zoom level, where the map data is organized into layers (e.g., by map feature type), and each layer is styled according to a style, as described above. Vector tiles, and therefore electronic maps generated by the client map application 160, may have multiple data sources for their map data.

The electronic map may be a two-dimensional or isometric projection, or may alternate between the two depending on, for example, a zoom level, an amount of pitch of the map (e.g., as set in response to user input), or the like. Buildings may be represented within the electronic map by graphical elements such as colored two-dimensional shapes within the electronic map.

The tile query module 320 retrieves building information for use in generating electronic maps with extruded buildings. Specifically, the tile query module 320 uses input location information to identify a corresponding building, and retrieves and returns map data of the identified building. For example, in one embodiment, the client map application 160 receives user input specifying a location within the electronic map. The location information can in various embodiments be a latitude/longitude pair, which are input to the tile query module 320 by the client map application 160; vector tile coordinates; or textual identifiers such as street address. However, for ease of description, embodiments described herein refer to an embodiment including location information in terms of latitude and longitude. Alternative techniques may be employed without straying from the principles disclosed herein.

The location specified by the user input may be a particular location or may be a set of locations determined by the client map application 160 based on one or more criteria specified by the user input. For example, the criteria may include a type of location (e.g., "gas stations"), and the client map application 160 specifies the user input as a set of locations (e.g., a set of gas stations within a threshold distance of the user). In such embodiments, techniques described herein with respect to one location instead apply to each location in the set of locations. For example, the client map application 160 retrieves a feature identifier for each location in the set of locations, the extrusion layer generation module 330 references each retrieved feature identifier, and the electronic map can include multiple extruded buildings (e.g., gas stations within the viewport of the electronic map).

The tile query module 320 searches the building extrusion dataset 310 for map features within a particular radius of the input latitude and longitude. In an embodiment, the particular radius is zero, such that only a map feature with a footprint including the latitude and longitude is identified as satisfying the query; other embodiments allow larger radiuses, to permit a degree of user imprecision. The tile query module 320 returns information about the map feature to the client map application 160. For example, the tile query module 320 may send a file, such as a JavaScript Object Notation (JSON) file, with information about the map feature (e.g., building) to the client map application 160. The file includes the feature ID of the identified map feature. In an embodiment, the tile query module 320 sends the file to the extrusion layer generation module 330. In an embodiment, the tile query module 320 leverages an application programming interface (API) of the mapping application 110 to query the building extrusion dataset 310 using a function call of the API. For example, the API may be MAPBOX TILEQUERY API.

As a specific example, the client map application 160 may receive user input specifying a destination location (e.g., the Empire State Building). The tile query module 320 queries the building extrusion dataset 310 for map features within a radius of zero from the destination location, and returns map data corresponding to the Empire State Building, including a feature ID uniquely identifying the Empire State Building.

In an embodiment, rather than receiving a specific location, the tile query module 320 receives user input specifying a type of building, such as restaurant, gas station, or the like. As such, the tile query module 320 searches the building extrusion dataset 310 for map features that are the type of building specified by the user input, and returns a set of building data including any matching map features. In an embodiment, the tile query module 320 limits the search to map features within a threshold distance of a current location of the mobile computing device 150, as determined, for example, based on GPS data. As a specific example, the client map application 160 may receive user input specifying a search for gas stations, and the tile query module 320 queries the building extrusion dataset 310 for map features of type "gas station" within five miles of a current location of the mobile computing device 150. In an embodiment, the received user input additionally includes a destination location, and the tile query module 320 specifically searches for map features of the specified type that are within a threshold distance of the destination location.

Alternatively, the tile query module 320 receives user input specifying a route. The tile query module 320 searches the building extrusion dataset 310 for one or more map features within a threshold distance of one or more points along the route. For example, a received route may follow a particular road, and a received type of building may be "gas station," and the tile query module 320 accordingly searches the building extrusion dataset 310 for gas stations within one mile of the particular road, e.g., a stretch of the particular road from a current or starting location to the destination location.

The extrusion layer generation module 330 dynamically generates an electronic map style layer (an "extrusion style layer") to style a specific building within an electronic map with a corresponding building model upon specification of the building, e.g., upon receipt of input by the user designating the specific building as a destination, or upon receipt of input by the user to a search field of the electronic map. The specific building is specified in the extrusion style layer by the map feature ID identified by and received from the tile query module 320. The extrusion style layer references the feature ID of the map feature. The feature ID is the feature ID returned by the tile query module 320.

At runtime, the extrusion module 170 dynamically renders the extruded building (that is, renders its building model) in response to the satisfaction of a rendering criterion, e.g., when the building is within the viewport of the electronic map, when the electronic map has reached at least a threshold zoom level, and/or when the electronic map has reached at least a threshold pitch level. When dynamically rendering the building model, the client map application 160 applies the extrusion style layer, along with one or more additional style layers, to the vector tile data in order to render the electronic map. The client map application 160 uses the feature ID in the extrusion style layer to fetch the corresponding building model from the building extrusion dataset 310 for rendering in the electronic map. The extrusion style layer specifies that only buildings with feature IDs referenced in the extrusion style layer have rendered building models in the electronic map.

In embodiments where multiple buildings are identified for extrusion, the extrusion style layer references the multiple feature IDs corresponding to the multiple buildings. At runtime, the client map application 160 uses the feature IDs to fetch corresponding building models for rendering in the electronic map. The client map application 160 may render individual buildings among the multiple buildings on a contingent basis, e.g., only when one or more rendering conditions are met (e.g., the aforementioned conditions of: when the building is within the viewport of the electronic map, when the electronic map has reached at least a threshold zoom level, and/or when the electronic map has reached at least a threshold pitch level). Similarly, when an extruded building no longer satisfies a rendering condition—e.g., it is moved out of the viewport—the client map application 160 ceases to render the building model.

The feature extension module 340 extends an extrusion style layer to include additional information about a building, such as contextual information, based on supplemental analysis of user data. The additional information may be included using further graphical elements, such as a label or one or more brand images for a business associated with the building, or a partial highlighting specifying a portion of the building model. The contextual information may additionally be used to customize the extruded building graphical element, such as using a particular color to color an extruded building graphical element representing a building that corresponds to a particular business. The client map application may retrieve the contextual information from map data and/or interconnected software of the mobile computing device 150. Examples of feature extension are described below with reference to FIG. 6, though additional or alternative techniques may be employed without straying from the principles disclosed herein.

The additional information acquired by the feature extension module 340 may originate from the building extrusion dataset 310 and/or the database 125. For example, the feature extension module 340 may add a label including a street address to a face of the building model. The feature extension module 340 may acquire the street address from the building extrusion dataset 310 and/or the database 125, e.g., from map data corresponding to the specific building represented by the building model. For example, the feature extension module 340 may query the database 125 for map data corresponding to the feature ID of the specific building, and extract data from an "address" field in the results of the query.

In an embodiment, the additional information acquired by the feature extension module 340 may originate from software connected to the client map application 160, e.g., third-party software with which the client map application 160 is integrated, or to which the client map application 160 has access, e.g., via an API for accessing data of the third-party software, or a publish-subscribe paradigm to receive data from the third-party software. As a specific example, a third-party calendar application may include an appointment with a particular person at a particular building on a particular date and time, on a particular floor of the building. The feature extension module 340 may receive a message including the meeting information and generate graphical features to add to the building model to provide greater context. For example, the feature extension module 340 may add a label indicating the name of the particular person, a name of the building, an address of the building, the date and time of the meeting, and/or the particular floor of the meeting.

Additionally, in an embodiment, the feature extension module 340 may add a highlight graphical element to a particular sub-portion of the building model in order to signal to the user the specific portion of the building that is relevant to the user. For example, if the building model includes representations of individual floors of the building, and the meeting is on the seventh floor, the feature extension module 340 generates a highlight graphical element adding a highlighting color to the seventh-floor portion of the building model, to distinguish it from the other floors of the building.

V. Electronic Maps

Figure 4:
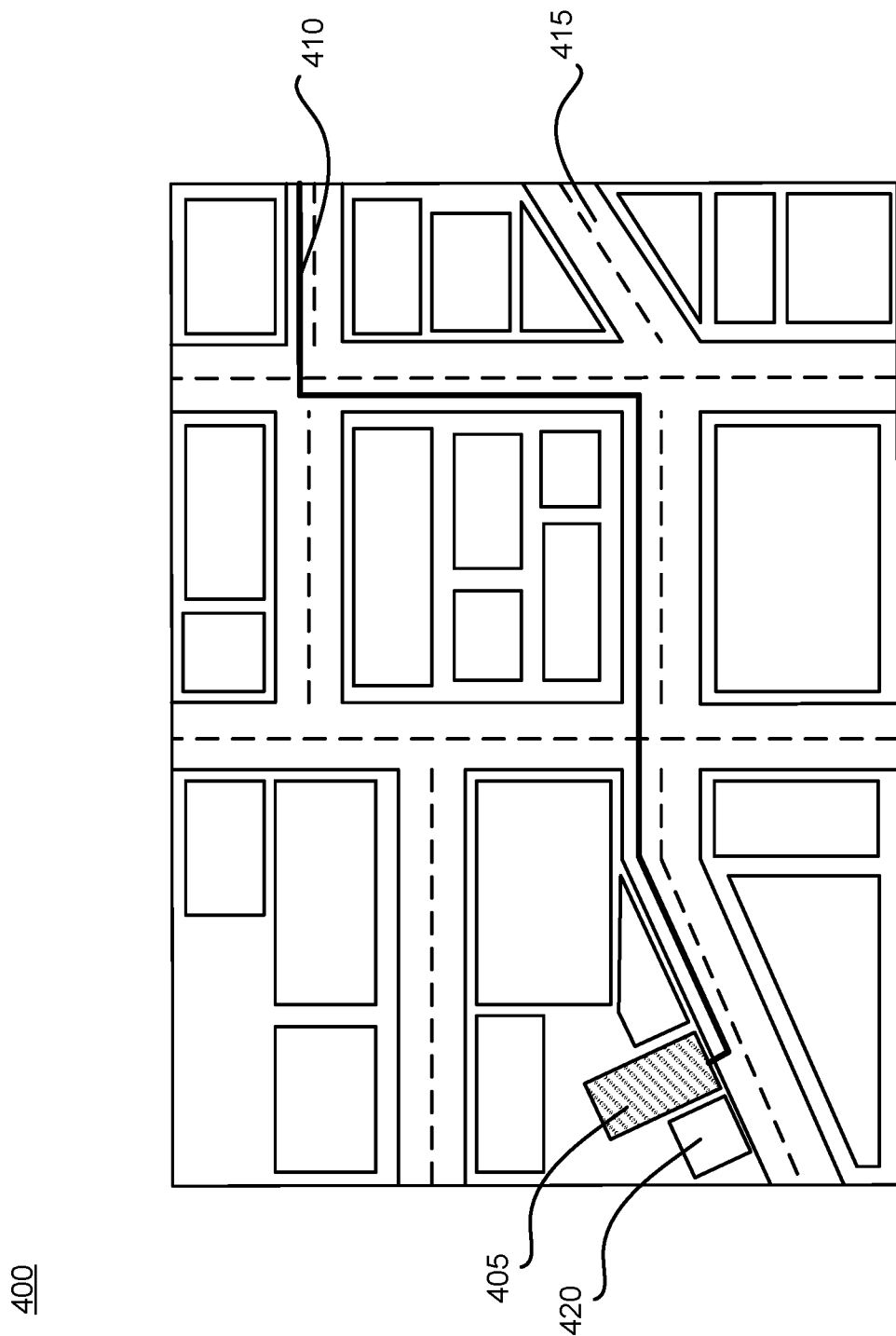
FIG. 4 illustrates an electronic map, according to one embodiment.

FIG. 4 illustrates an electronic map 400, according to one embodiment. The electronic map 400 includes building graphical elements, such as building 420 and building 405, as well as street graphical elements such as street graphical element 415. The electronic map additionally includes a navigation line 410 from a start location to a destination location, e.g., from a current location of the mobile computing device 150 to a destination building (building 405). Though building 405 is clearly distinguished in the figure via diagonal fill lines, and may similarly be visually distinguished in the electronic map 400 as displayed upon the mobile computing device 150 via one or more graphical elements, in practice the building 405 may be difficult to distinguish from its neighboring building 420. For example, a user driving to building 405 may not be able to tell at a quick glance whether the destination is building 405 or building 420. However, an extruded building rendering style can distinguish the building 405 from its neighboring building 420, enabling the user to quickly and easily identify the correct destination location.

Figure 5:
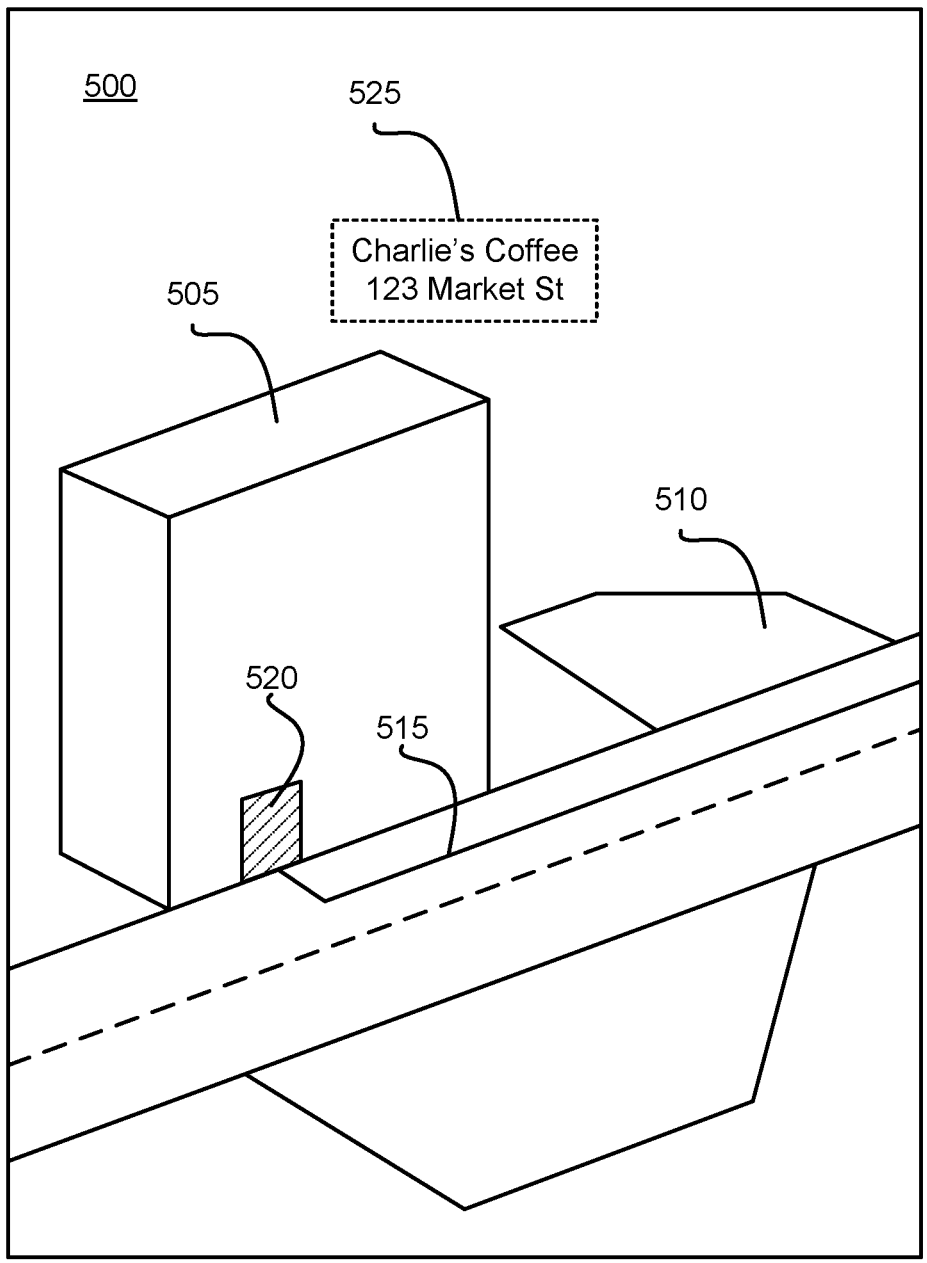
FIG. 5 illustrates an electronic map including an extruded building, according to one embodiment.

FIG. 5 illustrates an electronic map 500 including an extruded building, according to one embodiment. The electronic map 500 is in an isometric perspective, with a specific building 505 represented using a three-dimensional building model, whereas a neighboring building 510 is represented using a two-dimensional graphical element. The electronic map 500 additionally includes a navigation line 515 that leads to a door graphical element 520 upon the specific building 505. The door graphical element 520 is a graphical element added by the feature extension module 340, which in some embodiments may add door graphical elements 520 upon a portion of a building model at a position approximating the location of the door upon the building in reality. For example, the feature extension module 340 may add a door graphical element 520 upon a portion of a building model if configured to do so by an administrator of the client map application 160 and one or more conditions are met, such as the building model 505 including a door portion at which a door graphical element 520 may be added. The door graphical element 520 may include, for example, a neon yellow coloring to highlight it. The electronic map 500 additionally includes a label graphical element 525 created by the feature extension module 340. The label graphical element 525 includes a name of a company located at the specific building ("Charlie's Coffee") as well as an address of the building ("123 Market St"). The feature extension module 340 retrieved the company name and the address for the building from the database 125 and generated the label graphical element 525 for inclusion in the electronic map 500 along with the door graphical element 520. Thus, a user of the electronic map 500 can easily tell which building is the specific building 505, where its door is, and what its address and resident business are.

Figure 6:
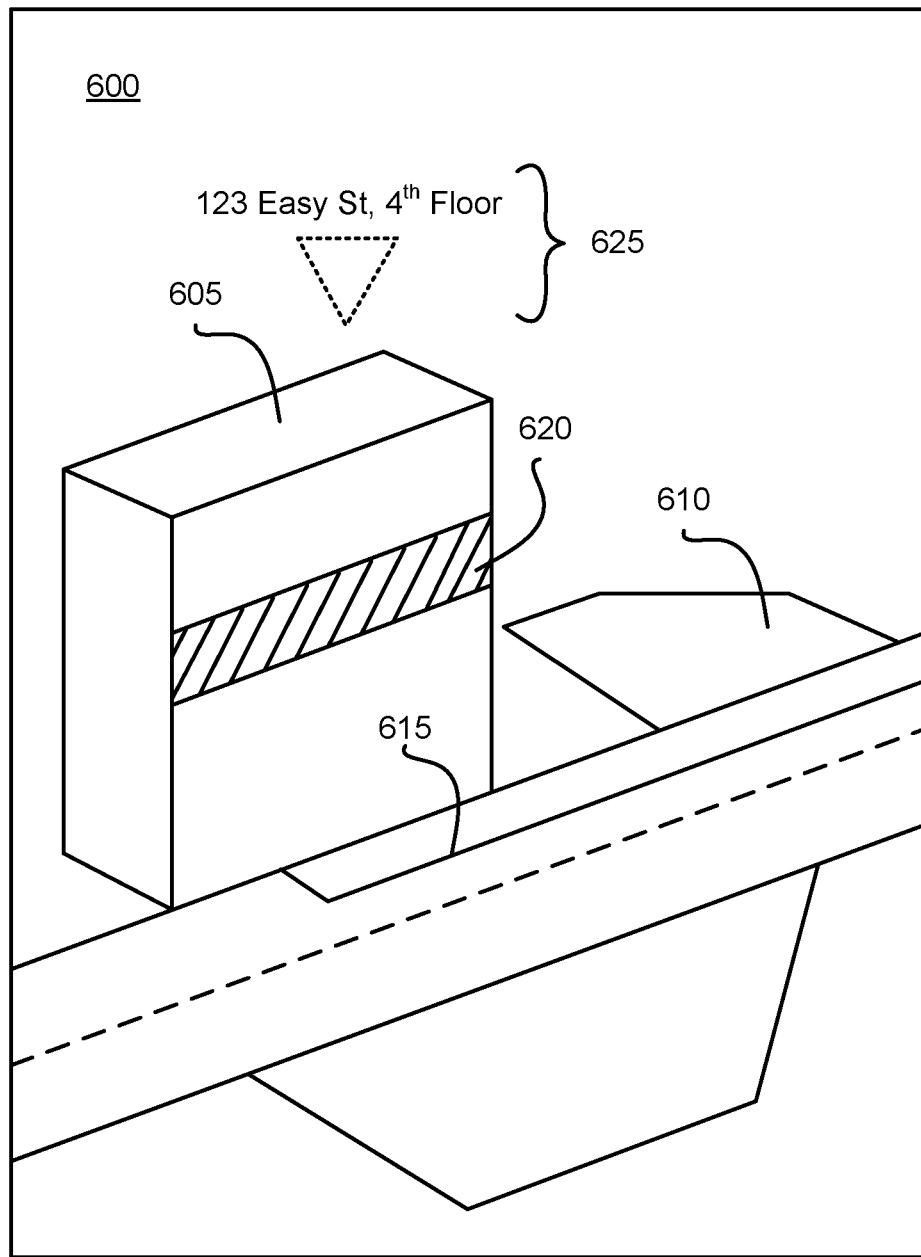
FIG. 6 illustrates an electronic map including an extruded building with feature-specific data, according to one embodiment.

FIG. 6 illustrates an electronic map 600 including an extruded building 605 with feature-specific contextual data, according to one embodiment. The electronic map 600 is in an isometric perspective, with the specific building 605 represented using a three-dimensional building model, whereas a neighboring building 610 is represented using a two-dimensional graphical element. The electronic map 500 additionally includes a navigation line 515 that leads to the specific building 605. The feature extension module 340 has added to the building model a floor graphical element 620 identifying a particular floor of the building 605. For example, the feature extension module 340 parses a calendar item specifying a meeting on the $4^{th}$ floor of 123 East St. As such, the feature extension module 340 adds the floor graphical element 620 to highlight the particular floor of the building 605 on which the meeting will occur. The feature extension module 340 additionally adds an icon graphical element 625 including an arrow above the building 605 and a label indicating the address and floor of the meeting. In this manner, a user of the electronic map 600 can easily tell which building is the specific building 605, its address, and the floor on which the user's meeting will occur.

VI. Processes

Figure 7:
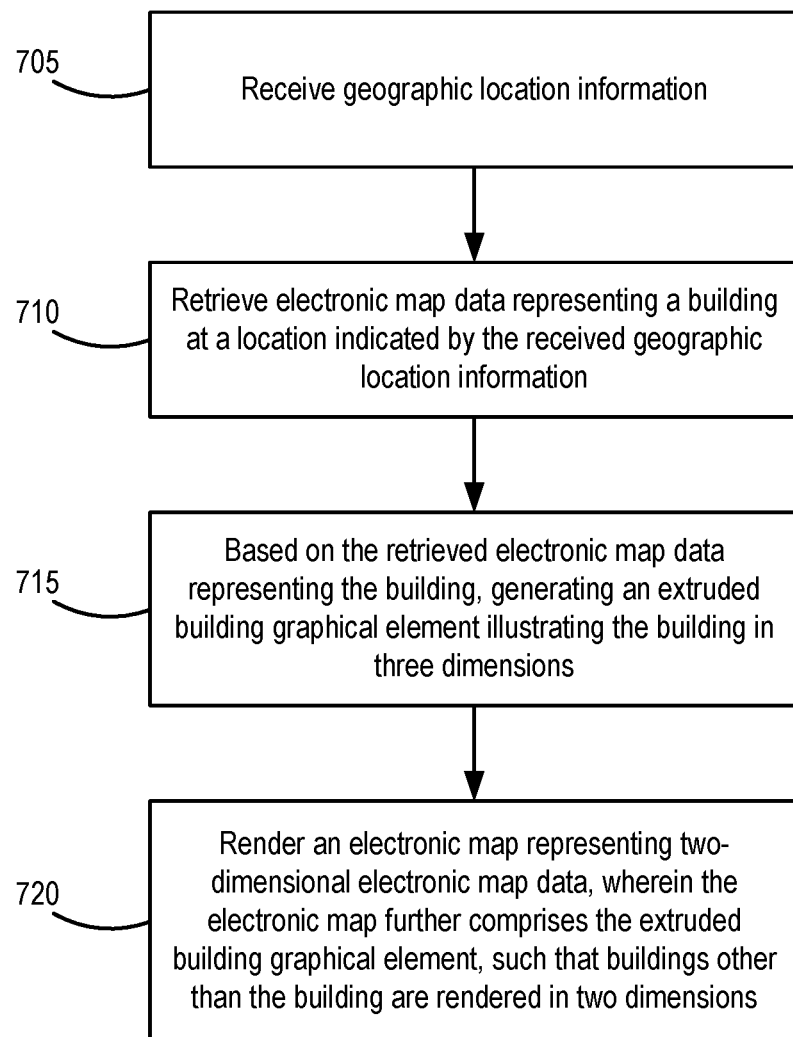
FIG. 7 illustrates a process for electronic map building extrusion, according to one embodiment.

FIG. 7 illustrates a process 700 for electronic map building extrusion, according to one embodiment. The client map application 160 receives 705 geographic location information. The client map application 160 may receive 705 the geographic location information from a user as input to the client map application 160 via input functionality of the mobile computing device 150, e.g., as a destination within, or derived from, a query to a navigation system. The input may be selection of a location upon the electronic map, or a textual entry of an address, latitude/longitude pair, or other geographic location information.

The client map application 160 retrieves 710 electronic map data representing a building at a location indicated by the received geographic location information. The client map application 160 may convert the received geographic location information 705 into another type of location information, then query a database for map features within a threshold radius of the coordinates. The results of the query are the retrieved 710 data, which includes a feature identifier.

The client map application 160 generates 715 an extruded building graphical element (e.g., a building model) illustrating the building in three dimensions. This may include generating an extrusion style layer referencing the feature identifier of the building.

At runtime, upon one or more render conditions being met, the client map application 160 renders 720 an electronic map representing two-dimensional electronic map data as well as the extruded building graphical element, where buildings other than the building are rendered distinctly from the extruded building graphical element, such as in two dimensions or an alternative color, but the building is rendered using the three-dimensional building model. The rendering 720 may additionally include one or more graphical elements added to the building model by the feature extension module 340.

VI. Additional Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    accessing an electronic map comprising two-dimensional and three-dimensional electronic map data;
    receiving geographic location information from a client device;
    responsive to receiving the geographic location information, obtaining a portion of the two-dimensional electronic map data representing an area associated with the geographic location information, and a portion of the three-dimensional electronic map data representing a building at a location indicated by the received geographic location information;
    analyzing user data to obtain contextual information associated with the building, wherein contextual information comprises a calendar item specifying an appointment and a building where the appointment is scheduled to occur; and
    rendering the area of the electronic map with the contextual information associated with the building, wherein the building on the electronic map is rendered in three dimensions as an extruded element annotated with the contextual information, and rest of the area on the electronic map is rendered in two dimensions.

2. The method of claim 1, wherein the contextual information comprises a business associated with the building.

3. The method of claim 2, wherein the contextual information comprises a color associated with the business associated with the building, and the building on the rendered electronic map is colored the color associated with the business.

4. The method of claim 2, wherein the contextual information comprises a brand image associated with the business associated with the building, and the building on the rendered electronic map is labeled with the brand image.

5. The method of claim 1, wherein the contextual information comprises a business at a portion of the building, and the portion of the building is highlighted or colored on the rendered electronic map.

6. The method of claim 5, wherein the portion of the building is a floor of the building, and the floor of the building is highlighted or colored on the rendered electronic map.

7. The method of claim 1, wherein the contextual information comprises an appointment at the building, and the building on the rendered electronic map is labeled with information associated with the appointment.

8. The method of claim 7, wherein the appointment is associated with a particular person, and information associated with the person is used to label the building on the rendered electronic map.

9. The method of claim 7, wherein the appointment is associated with a particular date and time, and information associated with the date and time is used to label the building on the rendered electronic map.

10. The method of claim 1, wherein the user data is obtained via an application program interface (API) for accessing data of a third-party application.

11. The method of claim 10, wherein the third-party application comprises a calendar application that stores an appointment scheduled at the building.

12. The method of claim 1, wherein obtaining additional contextual information associated with the building from a data system, and the area of the electronic map is rendered with the additional contextual information associated with the building.

13. A non-transitory computer-readable storage medium storing computer program instructions, when executed by one or more processors, cause the one or more processors to:
    access an electronic map comprising two-dimensional and three-dimensional electronic map data;
    receive geographic location information from a client device;
    responsive to receiving the geographic location information, obtain a portion of the two-dimensional electronic map data representing an area associated with the geographic location information, and a portion of the three-dimensional electronic map data representing a building at a location indicated by the received geographic location information;
    analyze user data to obtain contextual information associated with the building, wherein contextual information comprises a calendar item specifying an appointment and a building where the appointment is scheduled to occur; and
    render the area of the electronic map with the contextual information associated with the building, wherein the building on the electronic map is rendered in three dimensions as an extruded element annotated with the contextual information, and rest of the area on the electronic map is rendered in two dimensions.

14. The non-transitory computer-readable storage medium of claim 13, wherein the contextual information comprises a business associated with the building.

15. The non-transitory computer-readable storage medium of claim 14, wherein the contextual information comprises a color associated with the business associated with the building, and the building on the rendered electronic map is colored the color associated with the business.

16. The non-transitory computer-readable storage medium of claim 14, wherein the contextual information comprises a brand image associated with the business associated with the building, and the building on the rendered electronic map is labeled with the brand image.

17. The non-transitory computer-readable storage medium of claim 13, wherein the contextual information comprises a business at a portion of the building, and the portion of the building is highlighted or colored on the rendered electronic map.

18. The non-transitory computer-readable storage medium of claim 17, wherein the portion of the building is a floor of the building, and the floor of the building is highlighted or colored on the rendered electronic map.

19. The non-transitory computer-readable storage medium of claim 13, wherein the contextual information comprises an appointment at the building, and the building on the rendered electronic map is labeled with information associated with the appointment.

20. A computer system, comprising:
one or more processors; and
a non-transitory computer-readable storage medium storing computer program instructions, when executed by the one or more processors, cause the one or more processors to:
  access an electronic map comprising two-dimensional and three-dimensional electronic map data;
  receive geographic location information from a client device;
  responsive to receiving the geographic location information, obtain a portion of the two-dimensional electronic map data representing an area associated with the geographic location information, and a portion of the three-dimensional electronic map data representing a building at a location indicated by the received geographic location information;
  analyze user data to obtain contextual information associated with the building, wherein contextual information comprises a calendar item specifying an appointment and a building where the appointment is scheduled to occur; and
  render the area of the electronic map with the contextual information associated with the building, wherein the building on the electronic map is rendered in three dimensions as an extruded element annotated with the contextual information, and rest of the area on the electronic map is rendered in two dimensions.

* * * * *